(12) United States Patent
Xu et al.

(10) Patent No.: US 12,236,088 B2
(45) Date of Patent: Feb. 25, 2025

(54) RECYCLE OPTIMIZATION IN STORAGE ENGINE

(71) Applicant: Alibaba Group Holding Limited, Grand Cayman (KY)

(72) Inventors: Peng Xu, Milpitas, CA (US); Yikang Xu, Redmond, WA (US); Yu Du, Hangzhou (CN); Rui Wang, Redmond, WA (US)

(73) Assignee: Alibaba Group Holding Limited (KY)

( * ) Notice: Subject to any disclaimer, the term of this patent is extended or adjusted under 35 U.S.C. 154(b) by 10 days.

(21) Appl. No.: 18/269,918

(22) PCT Filed: Dec. 28, 2020

(86) PCT No.: PCT/CN2020/140149
§ 371 (c)(1),
(2) Date: Jun. 27, 2023

(87) PCT Pub. No.: WO2022/140916
PCT Pub. Date: Jul. 7, 2022

(65) Prior Publication Data
US 2024/0061577 A1 Feb. 22, 2024

(51) Int. Cl.
*G06F 3/06* (2006.01)

(52) U.S. Cl.
CPC .......... *G06F 3/0608* (2013.01); *G06F 3/0656* (2013.01); *G06F 3/0659* (2013.01); *G06F 3/067* (2013.01)

(58) Field of Classification Search
CPC .... G06F 3/0608; G06F 3/0656; G06F 3/0659; G06F 3/067; G06F 12/0246; G06F 2212/7205
See application file for complete search history.

(56) References Cited

U.S. PATENT DOCUMENTS

| 8,521,972 B1 | 8/2013 | Boyle et al. |
| 10,817,185 B1 | 10/2020 | Dumitru et al. |
| 11,094,365 B1 * | 8/2021 | Jang .................... G06F 9/30047 |
| 2016/0306577 A1 | 10/2016 | Canepa et al. |

(Continued)

FOREIGN PATENT DOCUMENTS

CN 103677674 A 3/2014

OTHER PUBLICATIONS

International Search Report mailed Sep. 29, 2021, from PCT/CN2020/140149, filed Dec. 28, 2020, 3 pages.

(Continued)

*Primary Examiner* — Hiep T Nguyen
(74) *Attorney, Agent, or Firm* — Lee & Hayes, P.C.

(57) ABSTRACT

When performing a recycling operation on a storage device, a storage system may use or create a data buffer in the storage device, and designate the data buffer to temporarily store data of data blocks to be recycled in the storage device using direct memory access (DMA) operations that are performed internally in the storage device, without the need of reading the data of the data blocks from the storage device and writing the data into a host memory of the storage system, thereby saving or reducing the consumptions of the communication bandwidth of a communication channel between the storage system and the storage device, and the memory bandwidth of the host memory.

20 Claims, 4 Drawing Sheets

(56) References Cited

U.S. PATENT DOCUMENTS

| | | | |
|---|---|---|---|
| 2017/0220463 A1* | 8/2017 | Malina | G06F 3/0688 |
| 2018/0088810 A1* | 3/2018 | Ramalingam | G06F 3/0659 |
| 2020/0042180 A1 | 2/2020 | Byun | |
| 2020/0042181 A1* | 2/2020 | Lee | G06F 3/0616 |
| 2020/0042223 A1* | 2/2020 | Li | G11C 29/52 |
| 2020/0065259 A1 | 2/2020 | Byun | |
| 2020/0272574 A1* | 8/2020 | Shen | G06F 12/1009 |
| 2020/0341844 A1* | 10/2020 | Shivanand | G06F 11/1088 |
| 2021/0098070 A1* | 4/2021 | Lee | G11C 13/0033 |
| 2021/0326068 A1* | 10/2021 | Li | H03M 13/05 |
| 2021/0334203 A1* | 10/2021 | Helmick | G06F 12/1054 |
| 2023/0207023 A1* | 6/2023 | Pletka | G11C 29/028 |
| | | | 365/185.12 |

OTHER PUBLICATIONS

Written Opinion mailed Sep. 23, 2021, from PCT/CN2020/140149, filed Dec. 28, 2020, 3 pages.

\* cited by examiner

RECYCLE OPTIMIZATION IN STORAGE ENGINE

BACKGROUND

The advent of memory technologies has led to the development of high-speed, high-performance storage devices. Examples of these storage devices include solid state devices (SSDs), NUMA (Non-Uniform Memory Access) devices, NVMe (Non-Volatile Memory Express) devices, etc. These storage devices possess characteristics, which include greater throughput and access speed, high reliability, lower power consumption, better energy efficiency, etc., as compared to traditional hard disks. These storage devices may also allow application programs of corresponding storage systems or computers to directly manage data placement, thereby providing additional flexibility to further improve storage efficiency.

When recycling or reclaiming storage spaces in data sectors of one of these high-speed, high-performance storage devices, a storage system (e.g., a host computer) associated with such storage device first needs to transfer data stored in the data sectors from the storage device, and write the data into a host memory of the storage system. After processing metadata necessary for locating the valid data, the storage system may then read the valid data from the host memory, and write the valid data back to other data sectors of the storage device. This not only consumes bandwidth of a communication line or channel for data transfers between the host memory and the storage device, but also consumes an additional space in the host memory for temporarily storing the data obtained from the data sectors of the storage device. Such consumptions of bandwidths of the communication channel and the host memory undoubtedly affect the performance of the storage device and the storage system, for example, during recycling operations of storage spaces.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, in existing technologies, when recycling or reclaiming storage spaces in data sectors of a storage device, a host computer associated with the storage device first needs to read data stored in the data sectors from the storage device, and write the data into a host memory of the host computer. After processing metadata necessary for locating the valid data, the host computer may then read the valid data from the host memory, and write the valid data back to other data sectors of the storage device. This not only consumes communication bandwidth between the host memory of host computer and the storage device, but also requires an additional space in the host memory for temporarily storing the data obtained from the data sectors of the storage device. Such extra consumptions of communication and memory bandwidths deteriorate the performance of both the storage device and the host computer.

This disclosure describes an example storage system. In implementations, when performing a recycling operation on a first storage device, the storage system may use or create a data buffer in the first storage device, and designate the data buffer to temporarily store data of data block(s) or sector(s) to be recycled in the first storage device using direct memory access (DMA) operations that are performed internally in the first storage device, without the need of reading the data of the data block(s) or sector(s) from the storage device and writing the data into a host memory (or system memory) of the storage system, thereby saving or reducing the consumptions of the communication bandwidth of a communication channel or line between the storage system and the first storage device and the memory bandwidth of the host memory. Furthermore, since the DMA operations are performed internally in the first storage device, the speed of the recycling operation is increased partly because the internal data transfer in the first storage device can be comparatively faster, and partly because there is no need to wait for the use of the communication channel or line between the storage system and the first storage device.

In implementations, the storage system may only need to read original metadata of the data blocks or sectors from the storage device, and update the original metadata to generate new metadata, and direct or instruct the first storage device to transfer a portion (such as valid data that is not deleted or labeled as deleted) of the data temporarily stored in the data buffer of the first storage device to other data block(s) or sector(s) of a second storage device using internal DMA operations (if the first storage device is the same as the second storage device) or through a communication channel or line between the first storage device and the second storage device (if the first storage device is not the same as the second storage device).

In both cases, the portion of the data that is transferred between the first storage device and the second device does not need to be first transferred from the first storage device (i.e., the data buffer or the data block(s) or sector(s) to be recycled) to the host memory of the storage system, and then transferred from the host memory of the storage system to the other data block(s) or sector(s) of the second storage device, thereby further saving or reducing the consumptions of the communication bandwidth of a communication channel or line between the storage system and the first storage device, the communication bandwidth of a communication channel or line between the storage system and the second storage device, and the memory bandwidth of the host memory of the storage system.

As described above, the storage system saves or reduces consumptions of communication bandwidths of communication channels and memory bandwidth of a host memory of the storage system by taking advantage of a data buffer included or newly created in a storage device.

In implementations, functions described herein to be performed by the storage system may be performed by multiple separate services or units. Moreover, although in the examples described herein, the storage system may be implemented as a combination of software and hardware implemented in an individual entity or device, in other examples, the storage system may be implemented and distributed as services provided in one or more computing devices over a network and/or in a cloud computing architecture.

The application describes multiple and varied embodiments and implementations. The following section describes an example framework that is suitable for practicing various implementations. Next, the application describes example systems, devices, and processes for implementing a storage system.

Example Environment

Figure 1:
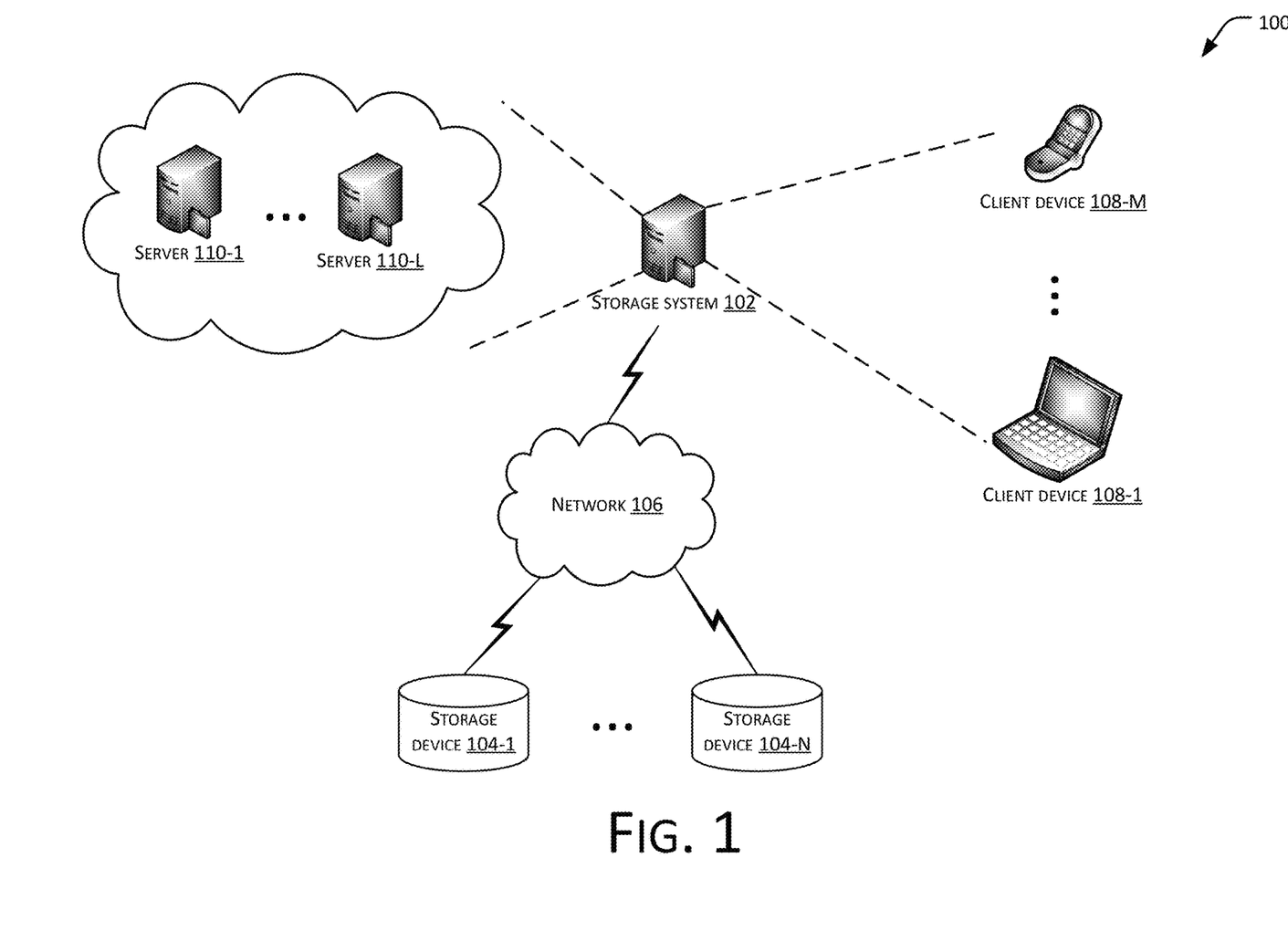
FIG. 1 illustrates an example environment in which a storage system may be used.

FIG. 1 illustrates an example environment 100 usable to implement a storage system. The environment 100 may include a storage system 102, and one or more storage devices 104-1, . . . , 104-N (which are collectively called as storage devices 104), where N is an integer greater than or equal to one. The storage system 102 and the plurality of storage devices 104 may communicate data with one another via a network 106. In this example, the one or more storage devices 104 are said to be included in the storage system 102. In other instances, the one or more storage devices 104 may be peripheral and accessible to the storage system 102.

In this example, the storage system 102 is described to be an individual entity or device. In other instances, the storage system 102 may be located or included in one or more client devices 108-1, . . . , 108-M (which are collectively called as client devices 108), and/or one or more servers 110-1, . . . , 110-L (which are collectively called as servers 110), where M and L are integers greater than or equal to one. In implementations, the storage system 102 may be included in a data center or cloud computing infrastructure including a plurality of servers 110.

In implementations, each of the one or more client devices 108 and the one or more servers 110 may be implemented as any of a variety of computing devices, but not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

The network 106 may be a data communication network including one or more data communication lines or channels that connect the storage system 102 (such as a memory of the storage system 102) and the one or more storage devices 104 through wireless and/or wired connections. Examples of wired connections may include an electrical carrier connection (for example, a communication cable, a computer or communication bus such as a serial bus, a PCIe bus or lane, etc.), an optical carrier connection (such as an optical fiber connection, etc.). Wireless connections may include, for example, a WiFi connection, other radio frequency connections (e.g., Bluetooth®, etc.), etc.

In implementations, a storage system 102 may perform a data recycling operation on a plurality of data sectors that include data labeled to be deleted or data needed to be moved in a certain storage device 104 (such as the storage device 104-1) on a regular basis or in response to an occurrence of an event. The storage system 102 may recycle or reclaim storage spaces occupied by such data using the method disclosed in the present disclosure.

Example Storage System

Figure 2:
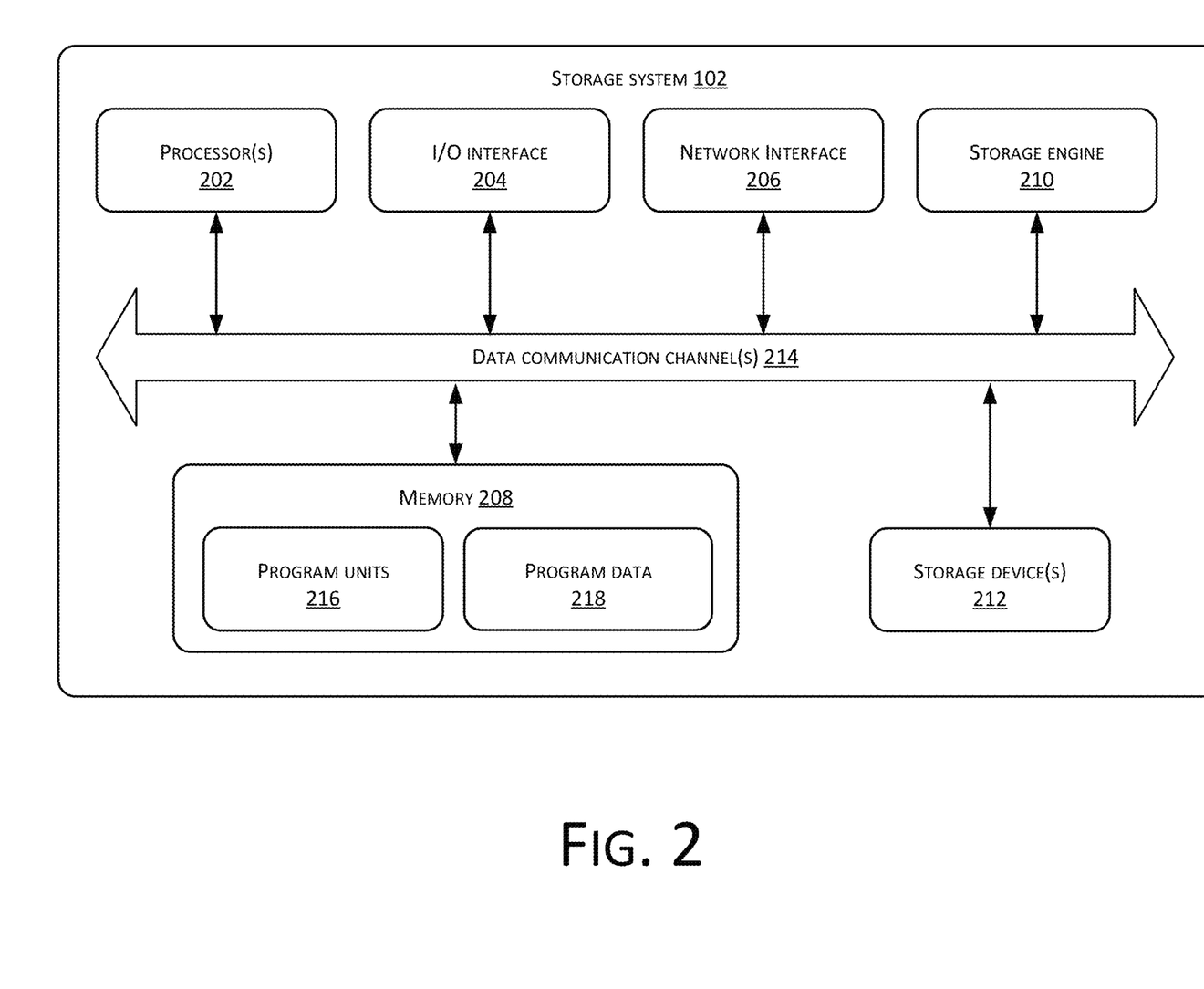
FIG. 2 illustrates the example storage system in more detail.

FIG. 2 illustrates the storage system 102 in more detail. In implementations, the storage system 102 may include, but is not limited to, one or more processors 202, an input/output (I/O) interface 204, and/or a network interface 206, and memory 208. Additionally, the storage system 102 may further include a storage engine 210, one or more storage devices 212 (such as the one or more storage devices 104), and one or more data communication channels 214. In implementations, the storage engine 210 may include at least one processor (such as the processor 202) and memory (such as the memory 208). In implementations, some of the functions of the storage system 102 may be implemented using hardware, for example, an ASIC (i.e., Application-Specific Integrated Circuit), a FPGA (i.e., Field-Programmable Gate Array), and/or other hardware. In implementations, the storage system 102 may include one or more computing devices such as the computing devices 108 as shown in FIG. 1, or may be included in one or more computing devices.

In implementations, the processors 202 may be configured to execute instructions that are stored in the memory 208, and/or received from the I/O interface 204, and/or the network interface 206. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 208 may include computer readable media (or processor readable media) in a form of volatile memory, such as Random Access Memory (RAM) and/or non-volatile memory, such as read only memory (ROM) or flash RAM. The memory 208 is an example of computer readable media (or processor readable media).

The computer readable media (or processor readable media) may include a volatile or non-volatile type, a removable or non-removable media, which may achieve storage of information using any method or technology. The information may include a computer readable instruction (or a processor readable instruction), a data structure, a program module or other data. Examples of computer readable media (or processor readable media) include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media (or processor readable media) does not include any transitory media, such as modulated data signals and carrier waves.

In implementations, the one or more data communication channels 214 may include at least one or more data communication lines or channels that connect the storage system 102 (such as the memory 208 of the storage system 102) and the one or more storage devices 212 through wireless and/or wired connections. Examples of wired connections may include an electrical carrier connection (for example, a communication cable, a computer or communication bus such as a serial bus, a PCIe bus or lane, etc.), an optical carrier connection (such as an optical fiber connection, etc.). Wireless connections may include, for example, a WiFi connection, other radio frequency connections (e.g., Bluetooth®, etc.), etc.

Although in this example, only hardware components are described in the storage system 102, in other instances, the storage system 102 may further include other hardware components and/or other software components such as program units 216 to execute instructions stored in the memory 208 for performing various operations, and program data 218 that stores application data and data of tasks processed by the storage system 102. In this example, the one or more storage devices 212 are described to be included in the storage system 102. In other instances, the one or more storage devices 212 may be associated with the storage system 102, such as being peripheral and accessible to the storage system 102. In implementations, the one or more storage devices 212 may be controlled and/or managed by the storage system 102.

Example Methods

Figure 3:
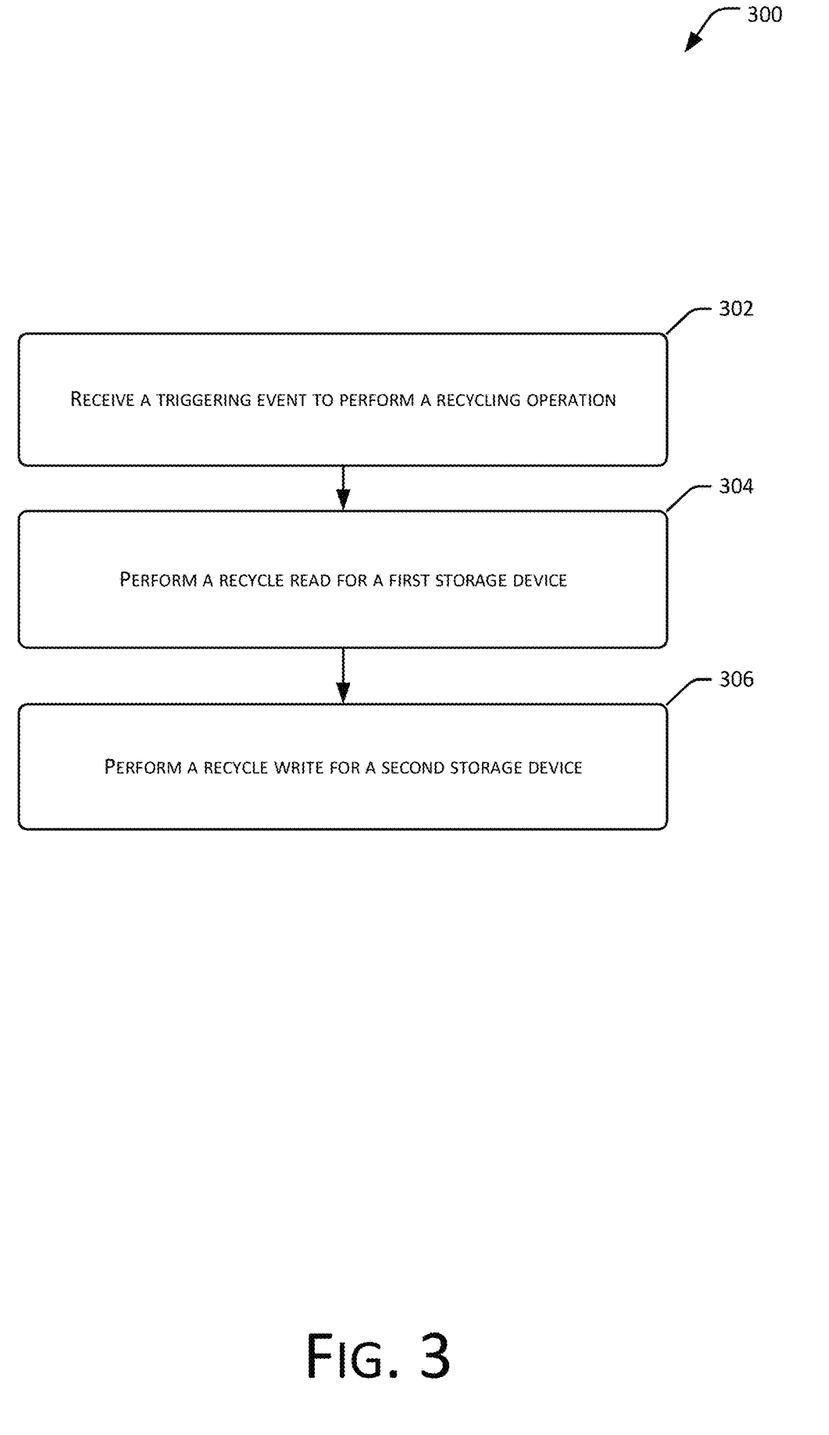
FIG. 3 illustrates an example recycling method.
Figure 4:
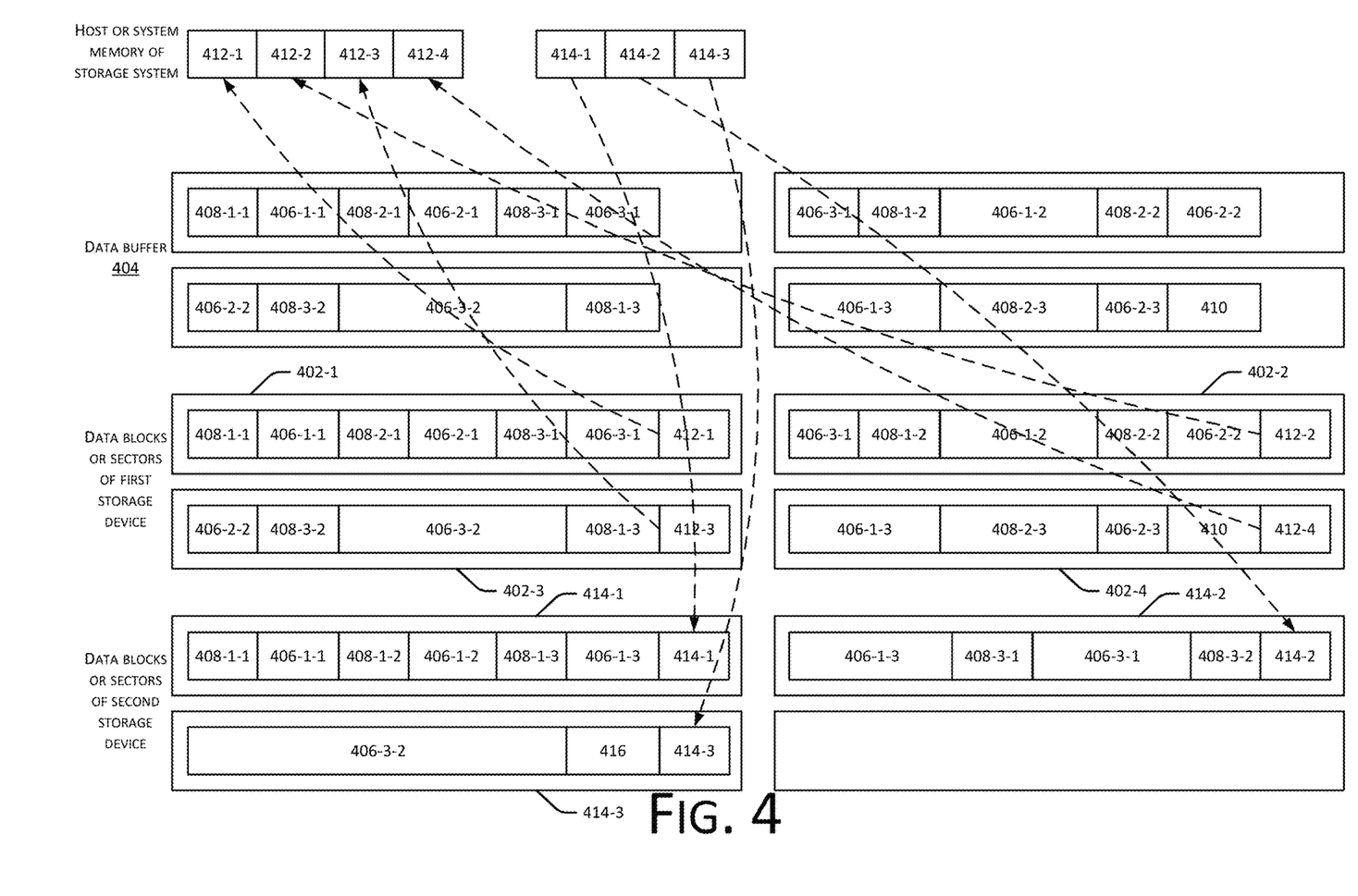
FIG. 4 illustrates an example data flow during a recycling operation.

FIG. 3 illustrates a schematic diagram depicting an example recycling method. FIG. 4 illustrates a schematic diagram depicting an example data flow during a recycling operation. The method of FIG. 3 may, but need not, be implemented in the environment of FIG. 1, and using the system of FIG. 2 and the data flow of FIG. 4. For ease of explanation, method 300 is described with reference to FIGS. 1, 2, and 4. However, the method 300 may alternatively be implemented in other environments and/or using other systems.

The method 300 is described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the storage system 102 may receive a triggering event to perform a recycling operation.

In implementations, the storage system 102 (or the storage engine 210) may receive a triggering event that prompts the storage system 102 (or the storage engine 210) to perform a recycling operation on a storage device 104 (e.g., the storage device 104-1). In implementations, the triggering event may include, but is not limited to, a request for a wear-leveling operation, a request for an error handling operation, a request for a read disturb operation, etc.

In implementations, the garbage collection operation may include generating free storage space after data (such as records, etc.) is deleted, and moving valid data (e.g., valid records, etc.) from source data block(s) or sector(s) to other data block(s) or sector(s) in order to allow reclaiming of free space by clearing the source data block(s) or sector(s). In implementations, a recycling operation may be more efficient if an amount of valid data in source data block(s) or sector(s) is less. In implementations, the triggering event may correspond to a request for a garbage collection operation on source data blocks or sectors having respective amounts of valid data to be first M least amount of data, where M is an integer greater than or equal to one. In this case, the storage system 102 (or the storage engine 210) or the storage device 104 may keep track of an amount of deleted data (and hence an amount of valid data) in each data block or sector in the storage device 104.

In implementations, the record merging operation may include merging data (such as records, etc.) of a same object or data chunk so that only a start address of the first piece of data (e.g., the first record) and a total length or size of the data (e.g., all the records) of the same object or data chunk need to be stored in a record mapping table to save memory. In implementations, an object or a data chunk may be partitioned or divided into a plurality of records, which may be stored in one or more data blocks or sectors. In implementations, the plurality of records of the object or the data chunk may be stored in consecutive or interleaving manner, depending on whether enough consecutive memory cells or spaces in the one or more data blocks or sectors are available for storing the object or the data chunk.

In implementations, a program-erase (PE) cycle is a sequence of events in which data is written to, then erased from, and then rewritten to memory cells of a storage device 104 (such as a solid state device, etc.). Since such PE cycle may cause a certain amount of physical damage to a medium of the storage device 104, the storage device 104 may have a limited number of cycles. In this respect, the PE cycles may then serve as a criterion for quantifying or determining an endurance of the storage device. In implementations, the wear-leveling operation may include monitoring PE cycles of data blocks or sectors of the storage device 104, and leveraging the data blocks or sectors of the storage device 104 by moving hot data (i.e., data which will be deleted at a later time) to data blocks or sectors having lower numbers of PE cycles, and moving cold data (i.e., data which is not deleted frequently) to data blocks or sectors having higher numbers of PE cycles.

In implementations, the error handling operation may include recycling valid data on data block(s) or sector(s) that encounter(s) a read or program failure to other data block(s) or sector(s) to avoid any potential or further data corruption.

In implementations, for a data block or sector (such as a super-block, etc.) that is programmed (e.g., data is written in the data block or sector), a data corruption of the data block or sector may occur after a certain number of times of reading due to interference between memory cells (e.g., NAND flash interference between word lines in flash memory, etc.). In implementations, to avoid data corruption, the read disturb operation may include recycling valid data (such as valid records, for example) from source data blocks or sectors to other data blocks or sectors prior to a read disturb threshold. In implementations, after erasing or clearing data in the source data blocks or sectors, the source data blocks or sectors can be reused again.

At block 304, the storage system 102 may perform a recycle read for a first storage device.

In implementations, after receiving the triggering event, the storage system 102 (or the storage engine 210) may perform a recycle read for a first storage device 104 (e.g., the storage device 104-1). In implementations, the storage system 102 (or the storage engine 210) may send a first instruction to the first storage device 104 to transfer data (such as record data or records of one or more objects or data chunks in this example) from a plurality of data blocks or sectors of the first storage device 104 to a data buffer of the first storage device 104.

In implementations, the plurality of data blocks or sectors of the first storage device 104 may include valid data (such as valid records of one or more objects or data chunks in this example) and deleted data (i.e., data or record(s) that is/are labeled as deleted). In implementations, data or a record may be labeled as deleted by setting a special bit (which may be called as a deletion bit) in a header of the data or the record stored in a storage device such as the first storage device 104.

In implementations, the storage system 102 (or the storage engine 210) may include or store a record mapping table in the host memory (e.g., the memory 208), and express or manage respective records of each object or data chunk that are stored in a certain storage device in the record mapping table in a key-value manner (such as a key-value pair, for example). In implementations, a key of a key-value pair (i.e., an identifier of a record stored in a storage device) may be expressed as a combination of a chunk identifier and a start offset in the storage device, and a value of the key-value pair (i.e., location information of the record) may be expressed as a physical address of the record in the storage device. In this case, data or a record may be labeled as deleted by setting a special flag (which may be called as a deletion flag) in a record mapping table stored in the host memory of the storage system 102.

For example, as shown in FIG. 4, data in four data blocks or sectors (namely data sectors 402-1, 402-2, 402-3, and 402-4 for the sake of simplicity) that are to be recycled in a storage device is transferred from these four data sectors 402-1, 402-2, 402-3, and 402-4 to a data buffer 404. In this example, the data in the data sectors 402-1, 402-2, 402-3, and 402-4 is said to include three objects or data chunks (namely data chunks 406-1, 406-2, and 406-3 for the sake of simplicity), with each data chunk being described to have been partitioned or divided into a plurality of records. In this example, records 406-1-1, 406-1-2, and 406-1-3 are records for the data chunk 406-1, records 406-2-1, 406-2-2, and 406-2-3 are records for the data chunk 406-2, and records 406-3-1 and 406-3-2 are records for the data chunk 406-3 stored in the four data blocks or sectors as shown in FIG. 4. Furthermore, each record (such as the record 406-1-1) includes a respective header (e.g., a header 408-$i$-$j$ for a record 406-$i$-$j$, where i and j are integers selected from {1, 2, 3}). Furthermore, padding data may also be added to fill up a data block or sector. For example, padding data 410 has been added in the data sector 402-4.

In implementations, the storage system 102 (or the storage engine 210) may instruct the first storage device 104 to transfer the data from the plurality of data blocks or sectors of the first storage device 104 to the data buffer of the first storage device 104 using direct memory access (DMA) operations that are performed internally in the first storage device 104. In this case, the storage system 102 (or the storage engine 210) does not need to read or receive the data of the plurality of data blocks or sectors from the first storage device 104 through a data communication channel or line (e.g., the data communication channel 214 such as a PCIe bus or lane, etc.), and then write the data into a host memory (e.g., the memory 208) of the storage system 102. This therefore saves the communication bandwidth of the data communication channel or line between the storage system 102 (or the storage engine 210) and the first storage device 104, and further saves the memory bandwidth of the host memory of the storage system 102.

In implementations, the data buffer of the first storage device 104 may include a data buffer that is designated or reserved by the storage system 102 or the first storage device 104 in advance. By way of example and not limitation, the storage system 102, the storage engine 210 or the first storage device 104 may employ a data buffer in the first storage device 104 that is currently designated or reserved for other purpose (such as storing commands or control instructions to be used by a controller of the storage device 104, etc.) and not originally intended for storing data to be transferred during a recycling operation. Additionally or alternatively, the storage system 102, the storage engine 210 or the first storage device 104 may create a data buffer in the first storage device 104 and designate or reserve the created data buffer for temporarily storing data to be transferred in the first storage device 104 during recycling operations. In this case, the storage system 102, the storage engine 210 or the first storage device 104 may determine (or periodically update) a size of the designated or reserved data buffer based on one or more factors, which may include, but are not limited to, an average or maximum size of objects or data chunks stored in the first storage device 104, an average or maximum scope of recycling operations in the first storage device 104 over a predetermined period of time in the past, a total storage size of the first storage device 104, etc.

By way of example and not limitation, the first storage device 104 may include an NVMe storage device, and the data buffer may include a controller memory buffer (CMB) that is designated or reserved to be used by a controller of the NVMe storage device (for example, for receiving and/or storing commands or control instructions). In implementations, the storage system 102, the storage engine 210 or the first storage device 104 may employ this controller memory buffer in the first storage device 104 for temporarily storing the record data transferred from the plurality of data blocks or sectors of the first storage device 104.

In implementations, the storage system 102 (or the storage engine 210) may read corresponding original metadata (i.e., block or sector metadata) of the plurality of data blocks or sectors of the first storage device into the host memory of the storage system 102 through a data communication channel (such as the data communication channel 214) between the storage system 102 (or the storage engine 210) and the first storage device 104. In implementations, the storage system 102 (or the storage engine 210) may employ a metadata pointer to specify a separate storage space or buffer in the host memory of the storage system 102 to store the corresponding original metadata of the plurality of data blocks or sectors of the first storage device 104.

In implementations, corresponding metadata of a data block or sector may include, but is not limited to, location information of a record header of a first record in the data block or sector, etc. Additionally, in some instances, the corresponding metadata of the data block or sector may further include an indication of an amount of deleted data or records in the data block or sector. In implementations, the indication of the amount of deleted data or records in the data block or sector may be represented and/or obtained by a number of deletion bits included in record headers of records stored in the data block or sector. In implementations, each data block or sector may include or reserve a special area (which can be called as block or sector metadata area, or out-of-band (OOF) area, etc.) therein, and store corresponding block or sector metadata of the respective data block or sector in the special area of the respective data block or sector.

In implementations, since only the corresponding metadata of the plurality of data blocks or sectors, rather than the data (such as the record data or records of the one or more objects or data chunks in this example) of the plurality of data blocks or sectors, is read or received from the first storage device 104, and is written into the host memory of the storage system 104, substantial reductions in consumptions of a communication bandwidth of a data communication channel or line between the storage system 102 (or the storage engine 210) and the first storage device 104, and a memory bandwidth of a host memory of the storage system 102 are achieved.

For example, as shown in FIG. 4, respective pieces of original metadata 412-1, 412-2, 412-3, and 412-4 corresponding to the data sectors 402-1, 402-2, 402-3, and 402-4 are transferred from the storage device to a storage system, and written into a host or system memory 414 of the storage system.

At block 306, the storage system 102 may perform a recycle write for a second storage device.

In implementations, the storage system 102 (or the storage engine 210) may send a second instruction to the first storage device to transfer the valid data (such as the valid records of the one or more objects or data chunks in this example) in the data buffer of the first storage device to one or more new data blocks or sectors of a second storage device 104. In implementations, the first storage device 104 may or may not be the same as the second storage device 104. By way of example and not limitation, the first storage device 104 may be the storage device 104-1, and the second storage device 104 may be the storage device 104-1 or the storage device 104-N, for example.

In implementations, the storage system 102 (or the storage engine 210) may determine whether the first storage device 104 is the same as the second storage device 104 to which the valid data is to be transferred before sending the second instruction. Additionally, the storage system 102 (or the storage engine 210) may determine or select which one or more data blocks or sectors of the second storage device to which the valid data is to be transferred before sending the second instruction.

In implementations, the storage system 102 (or the storage engine 210) may determine or select the one or more data blocks or sectors of the second storage device based at least in part on a type of the triggering event. For example, a request for a garbage collection operation, a request for a record merging operation, a request for a wear-leveling operation, and a request for a read disturb operation may very likely be related to a transfer of data between data blocks or sectors in a same storage device, while a request for an error handling operation may very likely be related to a transfer of data between data blocks or sectors of different storage devices.

Additionally or alternatively, the storage system 102 (or the storage engine 210) may determine or select the one or more data blocks or sectors of the second storage device based on a user instruction received from a client device of a user (such as an administrator of the storage system 102 or the storage devices 104). In this case, the user instruction may include information about the second storage device 104 to which the valid data is to be transferred.

In implementations, after determining whether the first storage device 104 is the same as the second storage device 104, the storage system 102 (or the storage engine 210) may determine or select one or more data blocks or sectors in the second storage device 104 to which the valid data is to be transferred. In implementations, the storage system 102 (or the storage engine 210) may determine or select one or more data blocks or sectors heuristically (e.g., selecting one or more data blocks or sectors that have a lower number of PE cycles as compared to the data blocks or sectors of the first storage device 104 on which the recycling operation is performed if the triggering event is a wear-leveling operation, etc.) or randomly. Additionally, in implementations, the storage system 102 (or the storage engine 210) may determine or select one or more data blocks or sectors of which storage spaces are all currently empty and available for storage.

In implementations, the storage system 102 (or the storage engine 210) may update the original metadata or create new metadata (i.e., new block or sector metadata) for the one or more data blocks or sectors of the second storage device 104 to which the valid data is to be transferred in the host memory of the storage system 102. In implementations, the storage system 102 (or the storage engine 210) may update the original metadata or create new metadata for the one or more data blocks or sectors of the second storage device 104 in the host memory of the storage system 102 when or while the first storage device 104 transfers the valid data from the data buffer of the first storage device 104 to the one or more new data blocks or sectors of the second storage device 104.

In implementations, as the first storage device 104 transfers the valid data (e.g., the valid records) from the data buffer to the one or more data blocks or sectors of the second storage device 104, the storage system 102 (or the storage engine 210) may update the original metadata or create the new metadata by recording new location information (e.g., a physical address) of respective headers of first records that are stored in the one or more data blocks or sectors of the second storage device 104. In implementations, the storage system 102 (or the storage engine 210) may store the updated or new metadata in the host memory. In implementations the storage system 102 (or the storage engine 210) may update or adjust the metadata pointer to point to the updated or new metadata in the host memory. In implementations, since not all the data originally stored in the plurality of data blocks or sectors that need to be recycled in the first storage device 104 is transferred to the one or more data blocks or sectors of the second storage device 104, the updated or new metadata may or may not be the same as the original metadata.

Furthermore, in implementations, the storage system 102 (or the storage engine 210) may create a data pointer that points to the data of the plurality of data blocks or sectors transferred to the data buffer. As the valid data currently stored in the data buffer of the first storage device 104 (i.e., the valid data that is originally stored in the plurality of data blocks or sectors that need to be recycled in the first storage device 104) is transferred to the one or more data blocks or sectors of the second storage device 104, the data pointer may be updated or adjusted to point to a corresponding location of a piece of valid data that is currently transferred to a data block or sector of the second storage device 104.

In implementations, the storage system 102 (or the storage engine 210) may update or adjust the data pointer to point to the valid data in the data buffer using the record mapping table stored in the host memory of the storage system 102. In implementations, since the record mapping table manages information of records stored in the storage devices (e.g., the first storage device 104 and the second storage device 104), the record mapping table may include information of valid records and deleted records in the plurality of data blocks or sectors of the first storage device 104. By way of example and not limitation, the record mapping table may include corresponding location information of each record (for example, each valid or deleted record) in a form of a physical address or in a form of an identifier of a data block or sector that stores the record and an offset (such as an offset from a start address of the data block or sector to a start address of the record), etc. Based on the information of the valid records and the deleted records in the plurality of data blocks or sectors of the first storage device 104 in the record mapping table, the storage system 102 (or the storage engine 210) may update or adjust the data pointer to point to each piece of the valid data in the data buffer, and guide or direct the first storage device 104 to transfer each piece of the valid data from the data buffer to a corresponding data block or sector of the second storage device 104.

In implementations, depending on whether the first storage device 104 is the same as or different from the second storage device 104, the second instruction sent by the storage system 102 (or the storage engine 210) may cause the first storage device 104 to transfer the valid data (such as the valid records in this example) in the data buffer to the one or more new data blocks or sectors using direct memory access operations that are performed internally in the first storage device 104, or through a communication bus between the first storage device 104 and the second storage device 104.

In implementations, if the first storage device 104 is the same as the second storage device 104 (e.g., both the first storage device and the second storage device correspond to the storage device 104-1 as shown in FIG. 1), the second instruction sent by the storage system 102 (or the storage engine 210) may cause the first storage device 104 to transfer the valid data (such as the valid records in this example) in the data buffer to the one or more new data blocks or sectors of the second storage device using direct memory access operations that are performed internally in the first storage device 104.

Alternatively, if the first storage device 104 is different from the second storage device 104 (e.g., the first storage device and the second storage device are the storage device 104-1 and the storage device 104-N respectively as shown in FIG. 1), the second instruction sent by the storage system 102 (or the storage engine 210) may cause the first storage device 104 to directly transfer the valid data (such as the valid records in this example) in the data buffer to the one or more new data blocks or sectors of the second storage device through a communication bus between the first storage device 104 and the second storage device 104. This avoids the valid data in the data buffer from going through the host memory of the storage system 102, and thus avoids the valid data in the data buffer from taking up any storage space in the host memory of the storage system 102 during the transfer.

In implementations, the storage system 102 (or the storage engine 210) may transfer the new metadata from the host memory of the storage system 102 to the one or more new data blocks or sectors of the second storage device 104. As shown in FIG. 4, the storage system 102 (or the storage engine 210) may transfer a corresponding piece of the new metadata from the host memory (e.g., the memory 208) of the storage system 102 to each new data block or sector of the second storage device 104. For example, FIG. 4 shows three pieces of new metadata, namely, metadata 414-1, 414-2, and 414-3 being updated or generated in the host memory of the storage system, and transferred to corresponding data sectors (i.e., data sectors 414-1, 414-2, and 414-3) of the second storage device. Furthermore, in this example, padding data 416 is also added to fill up the data sector 414-3.

In implementations, the storage system 102 (or the storage engine 210) may update a record mapping table in the host memory. For example, the storage system 102 (or the storage engine 210) may update the record mapping table based on identifiers of corresponding pieces of the valid data (i.e., identifiers of the valid records in this example) and respective new location information (e.g., respective physical addresses) of the corresponding pieces of the valid data in the one or more new data blocks or sectors of the second storage device 104.

Although in the above example, the storage system 102 (or the storage engine 210) is said to update the original metadata or generate the new metadata for the one or more new data blocks or sectors of the second storage device 104, in some instances, the first storage device 104 may be responsible for updating the original metadata or generating the new metadata for the one or more new data blocks or sectors of the second storage device 104 if the computing capability of the first storage device 104 (or the controller of the first storage device 104) is enough. In this case, processor(s) (such as the processor 202) of the storage system 102 or the storage engine 210 may be released from such updating or generating task of metadata, and the storage system 102 (or the storage engine 210) may simply need to receive the updated or new metadata to update the record mapping table stored in the host memory of the storage system 102.

Any of the acts of any of the methods described herein may be implemented at least partially by a processor or other electronic device based on instructions that are stored on one or more computer-readable media. By way of example and not limitation, any of the acts of any of the methods described herein may be implemented under control of one or more processors configured with executable instructions that may be stored on one or more computer-readable media.

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more processors of a storage system, the method comprising: performing a recycle read for a first storage device, performing the recycle read comprising: sending a first instruction to the first storage device to transfer record data from a plurality of sectors of the first storage device to a data buffer of the first storage device; and reading corresponding sector metadata of the plurality of sectors of the first storage device into a host memory of the storage system; and performing a recycle write for a second storage device, performing the recycle write comprising: sending a second instruction to the first storage device to transfer valid records of the record data in the data buffer of the first storage device to one or more new sectors of the second storage device; creating new sector metadata for the one or more sectors in the host memory; and transferring the new sector metadata from the host memory to the one or more new sectors of the second storage device.

Clause 2: The method of Clause 1, wherein the record data is transferred from the plurality of sectors of the first storage device to the data buffer of the first storage device using direct memory access operations.

Clause 3: The method of Clause 1, wherein the corresponding sector metadata of the plurality of sectors of the first storage device is read into the host memory of the storage system through a communication channel between the first storage device and the storage system.

Clause 4: The method of Clause 1, wherein the recycle read and the recycle write are performed in response to one of: a garbage collection operation, a record merging operation, a wear-leveling operation, a read disturb operation, an error handling operation.

Clause 5: The method of Clause 1, wherein the record data in the plurality of sectors of the first storage device comprises the valid records, and records that are labeled as deleted.

Clause 6: The method of Clause 1, further comprising: updating a record mapping table in the host memory, the record mapping table comprising at least relationships between identifiers of the valid records and locations of the valid records.

Clause 7: The method of Clause 1, wherein the first storage device is identical to the second storage device, and sending the second instruction to the first storage device to transfer the valid records of the record data in the data buffer of the first storage device to the one or more new sectors of the second storage device comprises causing the first storage device to perform direct memory access operations to transfer the valid records of the record data in the data buffer to the one or more new sectors.

Clause 8: The method of Clause 1, wherein the first storage device is different from the second storage device, and sending the second instruction to the first storage device to transfer the valid records of the record data in the data buffer of the first storage device to the one or more new sectors of the second storage device comprises causing the first storage device to transfer the valid records of the record data in the data buffer to the one or more new sectors of the second storage device through a communication channel between the first storage device and the second storage device.

Clause 9: The method of Clause 1, wherein the corresponding sector metadata of the plurality of sectors comprises location information of record headers of respective first records in the plurality of sectors.

Clause 10: One or more processor readable media storing executable instructions that, when executed by one or more processors of a storage system, cause the one or more processors to perform acts comprising: performing a recycle read for a first storage device, performing the recycle read comprising: sending a first instruction to the first storage device to transfer record data from a plurality of sectors of the first storage device to a data buffer of the first storage device; and reading corresponding sector metadata of the plurality of sectors of the first storage device into a host memory of the storage system; and performing a recycle write for a second storage device, performing the recycle write comprising: sending a second instruction to the first storage device to transfer valid records of the record data in the data buffer of the first storage device to one or more new sectors of the second storage device; creating new sector metadata for the one or more sectors in the host memory; and transferring the new sector metadata from the host memory to the one or more new sectors of the second storage device.

Clause 11: The one or more processor readable media of Clause 10, wherein the record data is transferred from the plurality of sectors of the first storage device to the data buffer of the first storage device using direct memory access operations.

Clause 12: The one or more processor readable media of Clause 10, wherein the corresponding sector metadata of the plurality of sectors of the first storage device is read into the host memory of the storage system through a communication channel between the first storage device and the storage system.

Clause 13: The one or more processor readable media of Clause 10, wherein the recycle read and the recycle write are performed in response to one of: a garbage collection operation, a record merging operation, a wear-leveling operation, a read disturb operation, an error handling operation.

Clause 14: The one or more processor readable media of Clause 10, wherein the record data in the plurality of sectors of the first storage device comprises the valid records, and records that are labeled as deleted.

Clause 15: The one or more processor readable media of Clause 10, the acts further comprising: updating a record mapping table in the host memory, the record mapping table comprising at least relationships between identifiers of the valid records and locations of the valid records.

Clause 16: The one or more processor readable media of Clause 10, wherein the first storage device is identical to the second storage device, and sending the second instruction to the first storage device to transfer the valid records of the record data in the data buffer of the first storage device to the one or more new sectors of the second storage device comprises causing the first storage device to perform direct memory access operations to transfer the valid records of the record data in the data buffer to the one or more new sectors.

Clause 17: The one or more processor readable media of Clause 10, wherein the first storage device is different from the second storage device, and sending the second instruction to the first storage device to transfer the valid records of the record data in the data buffer of the first storage device to the one or more new sectors of the second storage device comprises causing the first storage device to transfer the valid records of the record data in the data buffer to the one or more new sectors of the second storage device through a communication channel between the first storage device and the second storage device.

Clause 18: The one or more processor readable media of Clause 10, wherein the corresponding sector metadata of the plurality of sectors comprises location information of record headers of respective first records in the plurality of sectors.

Clause 19: A storage system comprising: one or more processors; and host memory storing executable instructions that, when executed by the one or more processors, cause the one or more processors to perform acts comprising: performing a recycle read for a first storage device, performing the recycle read comprising: sending a first instruction to the first storage device to transfer record data from a plurality of sectors of the first storage device to a data buffer of the first storage device; and reading corresponding sector metadata of the plurality of sectors of the first storage device into the host memory; and performing a recycle write for a second storage device, performing the recycle write comprising: sending a second instruction to the first storage device to transfer valid records of the record data in the data buffer of the first storage device to one or more new sectors of the second storage device; creating new sector metadata for the one or more sectors in the host memory; and transferring the new sector metadata from the host memory to the one or more new sectors of the second storage device.

Clause 20: The storage system of Clause 19, wherein the record data is transferred from the plurality of sectors of the first storage device to the data buffer of the first storage device using direct memory access operations, and the corresponding sector metadata of the plurality of sectors of the first storage device is read into the host memory through a communication channel between the first storage device and the storage system.

What is claimed is:

1. A method implemented by one or more processors of a storage system, the method comprising:
   performing a recycle read for a first storage device, performing the recycle read comprising:
      sending a first instruction to the first storage device to transfer record data from a plurality of sectors of the first storage device to a data buffer of the first storage device; and
      reading corresponding sector metadata of the plurality of sectors of the first storage device into a host memory of the storage system; and
   performing a recycle write for a second storage device, performing the recycle write comprising:
      sending a second instruction to the first storage device to transfer valid records of the record data in the data buffer of the first storage device to one or more new sectors of the second storage device;
      creating new sector metadata for the one or more sectors in the host memory; and
      transferring the new sector metadata from the host memory to the one or more new sectors of the second storage device.

2. The method of claim 1, wherein the record data is transferred from the plurality of sectors of the first storage device to the data buffer of the first storage device using direct memory access operations.

3. The method of claim 1, wherein the corresponding sector metadata of the plurality of sectors of the first storage device is read into the host memory of the storage system through a communication channel between the first storage device and the storage system.

4. The method of claim 1, wherein the recycle read and the recycle write are performed in response to one of: a garbage collection operation, a record merging operation, a wear-leveling operation, a read disturb operation, an error handling operation.

5. The method of claim 1, wherein the record data in the plurality of sectors of the first storage device comprises the valid records, and records that are labeled as deleted.

6. The method of claim 1, further comprising: updating a record mapping table in the host memory, the record mapping table comprising at least relationships between identifiers of the valid records and locations of the valid records.

7. The method of claim 1, wherein the first storage device is identical to the second storage device, and sending the second instruction to the first storage device to transfer the valid records of the record data in the data buffer of the first storage device to the one or more new sectors of the second storage device comprises causing the first storage device to perform direct memory access operations to transfer the valid records of the record data in the data buffer to the one or more new sectors.

8. The method of claim 1, wherein the first storage device is different from the second storage device, and sending the second instruction to the first storage device to transfer the valid records of the record data in the data buffer of the first storage device to the one or more new sectors of the second storage device comprises causing the first storage device to transfer the valid records of the record data in the data buffer to the one or more new sectors of the second storage device through a communication channel between the first storage device and the second storage device.

9. The method of claim 1, wherein the corresponding sector metadata of the plurality of sectors comprises location information of record headers of respective first records in the plurality of sectors.

10. One or more processor readable media storing executable instructions that, when executed by one or more processors of a storage system, cause the one or more processors to perform acts comprising:
    performing a recycle read for a first storage device, performing the recycle read comprising:
       sending a first instruction to the first storage device to transfer record data from a plurality of sectors of the first storage device to a data buffer of the first storage device; and
       reading corresponding sector metadata of the plurality of sectors of the first storage device into a host memory of the storage system; and
    performing a recycle write for a second storage device, performing the recycle write comprising:
       sending a second instruction to the first storage device to transfer valid records of the record data in the data buffer of the first storage device to one or more new sectors of the second storage device;
       creating new sector metadata for the one or more sectors in the host memory; and
       transferring the new sector metadata from the host memory to the one or more new sectors of the second storage device.

11. The one or more processor readable media of claim 10, wherein the record data is transferred from the plurality of sectors of the first storage device to the data buffer of the first storage device using direct memory access operations.

12. The one or more processor readable media of claim 10, wherein the corresponding sector metadata of the plurality of sectors of the first storage device is read into the host memory of the storage system through a communication channel between the first storage device and the storage system.

13. The one or more processor readable media of claim 10, wherein the recycle read and the recycle write are performed in response to one of: a garbage collection operation, a record merging operation, a wear-leveling operation, a read disturb operation, an error handling operation.

14. The one or more processor readable media of claim 10, wherein the record data in the plurality of sectors of the first storage device comprises the valid records, and records that are labeled as deleted.

15. The one or more processor readable media of claim 10, the acts further comprising: updating a record mapping table in the host memory, the record mapping table comprising at least relationships between identifiers of the valid records and locations of the valid records.

16. The one or more processor readable media of claim 10, wherein the first storage device is identical to the second storage device, and sending the second instruction to the first storage device to transfer the valid records of the record data in the data buffer of the first storage device to the one or more new sectors of the second storage device comprises causing the first storage device to perform direct memory access operations to transfer the valid records of the record data in the data buffer to the one or more new sectors.

17. The one or more processor readable media of claim 10, wherein the first storage device is different from the second storage device, and sending the second instruction to the first storage device to transfer the valid records of the record data in the data buffer of the first storage device to the one or more new sectors of the second storage device comprises causing the first storage device to transfer the valid records of the record data in the data buffer to the one or more new sectors of the second storage device through a communication channel between the first storage device and the second storage device.

18. The one or more processor readable media of claim 10, wherein the corresponding sector metadata of the plurality of sectors comprises location information of record headers of respective first records in the plurality of sectors.

19. A storage system comprising:
one or more processors; and
host memory storing executable instructions that, when executed by the one or more processors, cause the one or more processors to perform acts comprising:
performing a recycle read for a first storage device, performing the recycle read comprising:
sending a first instruction to the first storage device to transfer record data from a plurality of sectors of the first storage device to a data buffer of the first storage device; and
reading corresponding sector metadata of the plurality of sectors of the first storage device into the host memory; and
performing a recycle write for a second storage device, performing the recycle write comprising:
sending a second instruction to the first storage device to transfer valid records of the record data in the data buffer of the first storage device to one or more new sectors of the second storage device;
creating new sector metadata for the one or more sectors in the host memory; and
transferring the new sector metadata from the host memory to the one or more new sectors of the second storage device.

20. The storage system of claim 19, wherein the record data is transferred from the plurality of sectors of the first storage device to the data buffer of the first storage device using direct memory access operations, and the corresponding sector metadata of the plurality of sectors of the first storage device is read into the host memory through a communication channel between the first storage device and the second storage device.

* * * * *